(No Model.)
F. B. NEWTON.
HANDLE BENDING MOLD.
No. 367,543. Patented Aug. 2, 1887.
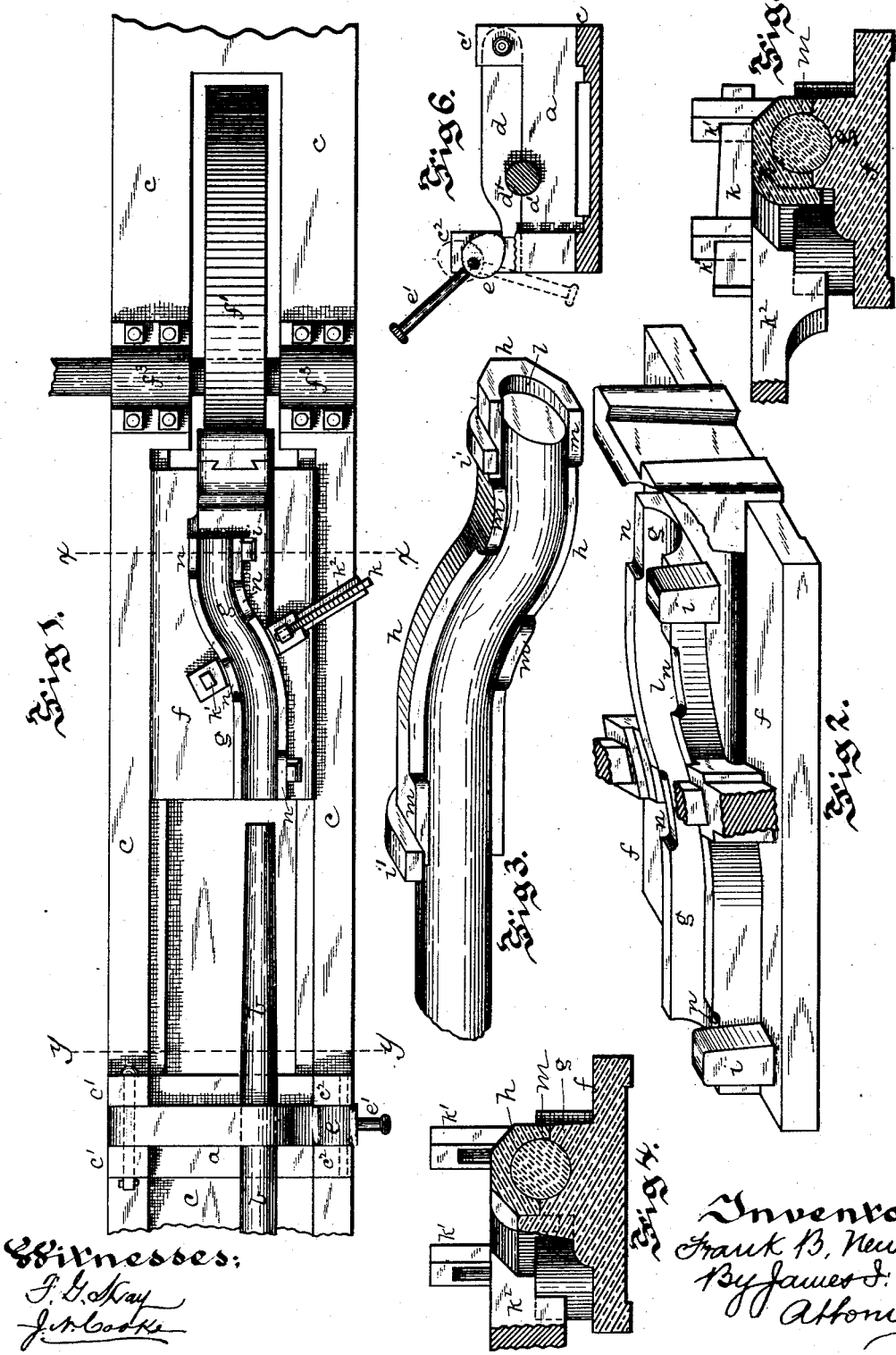

UNITED STATES PATENT OFFICE.

FRANK B. NEWTON, OF PITTSBURG, PENNSYLVANIA, ASSIGNOR TO HUSSEY, BINNS & CO., (LIMITED,) OF SAME PLACE.

HANDLE-BENDING MOLD.

SPECIFICATION forming part of Letters Patent No. 367,543, dated August 2, 1887.

Application filed July 22, 1886. Serial No. 208,802. (No model.)

*To all whom it may concern:*

Be it known that I, FRANK B. NEWTON, of Pittsburg, in the county of Allegheny and State of Pennsylvania, have invented a new and useful Improvement in Handle-Bending Molds; and I do hereby declare the following to be a full, clear, and exact description thereof.

My invention relates to handle-bending molds, these molds being employed for bending the curved portion at the base of shovel-handles and like articles.

In the most approved form of molds as heretofore constructed they were made in two parts divided horizontally through the center of the mold cavity or matrix, the lower portion, generally termed the "bottom mold," being cast upon a reciprocating slide mounted in a suitable frame or bed, and the upper portion of the mold, generally termed the "retaining-mold," fitting on top of the lower portion and being held in line therewith by lugs on the outer face of the mold, the two half-molds being clamped firmly together, and by means of a suitable cam or other apparatus the molds being forced onto the handle, which was held in a suitable clamp. After this operation the mold was opened and the top or retaining mold was lifted off, the bent handle remaining within this top mold and the mold and handle being placed upon a suitable rack, where they remained until the handle dried, the mold retaining the handle in the shape into which it was bent, as above described, until it was thoroughly dried. Another retaining-mold was then placed upon the bottom or forming mold and the operation repeated. In these molds as heretofore constructed the molds were divided through the center of the circular opening or matrix of the mold, one half of this matrix being formed in the forming-mold and the other half in the retaining-mold; and as the retaining-mold extended only half-way over the handle held therein during drying, in some cases the strain on the handle was so great as to cause it to fly out of the retaining-mold, the mold not having a sufficient hold thereon, and in other cases, though the entire handle would not fly out of the mold, yet one or the other end of the portion bent therein would escape, forming what is termed a "side bend" and rendering the handle useless. It was also found that if the handle was split, either before bending or during the bending operation, though a portion of the handle would remain in the mold, yet the part split off was liable to escape from the mold, thus ruining the handle.

The object of my invention is to overcome these objections to these handle-bending molds; and it consists, generally, in a two-part handle-bending mold the removable or retaining mold part of which has its side edges extending beyond the center of the article to be bent and rests upon the fixed part; and it also consists in a two-part handle-bending mold, the removable or retaining mold part of which has one or more lugs extending beyond the center of the article to be bent and the fixed part having recesses in which said lugs fit, as will be more fully hereinafter set forth.

It also consists in certain details of construction, as hereinafter specifically set forth.

To enable others skilled in the art to make and use my invention, I will describe the same more fully, referring to the accompanying drawings, in which—

Figure 1 is a plan view of a handle-bending machine, the retaining mold being removed. Fig. 2 is a perspective view, partly broken away, of the reciprocating slide and forming-mold. Fig. 3 is a like view of the retaining-mold, showing the handle bent therein. Fig. 4 is a cross-section of the mold on the line *x x*, Fig. 1. Fig. 5 is a cross-section of a modification of the mold where the walls or side portions of the retaining-mold extend beyond the center of the article bent; and Fig. 6 is a cross-section on the line *y y*, Fig. 1, a portion being broken away, showing the means for holding the handle during the bending.

Like letters of reference indicate like parts in each.

The handle-bending machine is provided with a clamp, *a*, for holding the handle *b* during the bending operation, this clamp being formed on the stationary bed or frame *c* of the machine and being formed of a hinged portion, *d*, pivoted in the lugs *c'*, and having a semicircular recess, *d'*, therein fitting over a like recess, *a'*, in the lower part or jaw of the clamp $c$, the opposite end of the hinged portion $d$ fitting between the lugs $c^2$, in which is mounted the cam or eccentric $e$, having a handle, $e'$, the eccentric being so mounted in the lugs or standards $c^2$ that when the eccentric is raised the hinged portion $d$ may be dropped between the standards $c^2$ and the eccentric, then brought into contact with the end of the hinged portion in such manner as to cause it to bind firmly upon the handle $b$, which is placed in the recesses $d'$ $a'$ of the clamp.

Mounted in suitable guides in the bed $c$ is the reciprocating slide $f$, carrying at the rear thereof the cam-box $f'$, within which fits a suitable cam, the shaft of this cam being mounted in boxes $f^3$ on the bed $c$, and the cam being operated by suitable power.

Cast on the reciprocating slide $f$ is the bottom portion or half of the bending-mold, generally termed the "forming-mold," $g$, and fitting on this forming-mold is the upper half or retaining mold, $h$, the two half-molds, when fitting together, forming a suitable cavity or matrix, within which the handle is bent, the bending operation being accomplished by forcing the bending-mold onto the handle as it is held within the clamp $a$, as above described.

The retaining-mold and forming-mold are held in line with each other by means of lugs $i$ on the forming-mold and $i'$ on the retaining-mold, the lugs $i'$ fitting in front of the lugs $i$, and so preventing the molds from being forced out of line with each other when the bending-mold is forced upon the handle, and the two half-molds are clamped together by any suitable means, that shown in the drawings being by a wedge, $k$, extending through slots in the standards $k'$ above the retaining-mold, the slide $k^2$ being formed at one side of the mold to support the wedge when it is not in use. The bending-mold is divided horizontally through the center of its circular cavity or matrix $l$, half of said cavity being formed in each mold; and the retaining-mold has lugs or extensions $m$ formed thereon at the point or points where the handle bears with greatest pressure against the sides of the mold, recesses $n$ being formed in the forming-mold to receive these lugs, these lugs acting, after the bending of the article and when it is retained in the top mold, $h$, to hold the handle more securely within the retaining-mold, as they extend over the handle farther than the center thereof, and so prevent the handle from flying or escaping out of the mold.

In the construction preferred by me I provide the retaining-mold with these lugs on the side of each, and against which the handle presses when held in the mold, and with one or more lugs between the ends at the points where the handle bears or presses with the greatest force, these additional lugs being generally formed on the inner edge of the curved portions of the mold. In practice I find that the mold is efficient where the lugs are employed only at the ends; but to give greater security I prefer to employ the lugs between the ends, as above described, these serving to retain the handle in proper shape where it is split in the body thereof between the portions at the ends of the retaining-mold.

The mold may be constructed as shown in Fig. 5, where, instead of dividing the body of the mold in the center of the matrix or mold-cavity, I divide the mold below the center, the greater portion being formed in the retaining-mold and the portion extending beyond the center of the handle when held in the mold being continuous along both side portions thereof; but this form of mold is not as desirable as that in which the mold is divided in the center of the mold-cavity and lugs are formed at the bearing-points of the handle on the retaining-mold, as the mold has not the same strength and the retaining-mold is liable to break under the strain of forcing it upon the handle, the forming-mold cast within the reciprocating slide bearing the heaviest strain when the bending-mold is forced upon the handle, and being made thicker and stronger than the retaining-mold for this reason.

When my improved bending-mold is employed, the end of the handle to be bent is inserted in a steam and hot-water bath and soaked for a sufficient period, until the end thereof to be bent is soft and pliable. It is then secured within the clamp $a$ in the manner above described, the end of the handle being in line with the forward end of the cavity $l$ of the bending-mold, and the mold is then advanced by the cam and forced upon the handle as it is held in the clamp, the mold bending the handle to the desired shape. The mold is then opened and the retaining-mold $h$ and the handle lifted out, the bent handle and its retaining-mold being placed upon a suitable rack and the handle remaining in the retaining-mold until it is dried and set in the shape into which it is bent. As the lugs or projecting portions of the retaining-mold extend beyond the center of the handle held therein, it is evident that the handle is held much more securely than where the mold is divided through the center of the mold-cavity, as above described, all the lugs on the mold at the bearing-points of the handle serving to hold the handle securely therein and prevent its flying out of the mold, while the lugs at the end of the retaining-mold prevent the ends of the handle from escaping therefrom and forming side bends. In case the end of the handle is split either before or during the bending operation, the lug at the rear end of the retaining-mold, as it extends beyond the center of the handle, acts in almost all cases to prevent the split portion from escaping from the mold, this splitting at the ends of the mold being found unobjectionable, provided all parts of the handle are held in the position in which they are bent until they are dried and set, and in case of a split being formed in the handle between the ends held in the retaining-mold the handle is prevented from splitting farther and escaping by the lugs between the ends thereof. Practical use has proven that by the employment of the portions of the retaining-mold extending beyond the center of the handle bent in any of the forms above described I am enabled to overcome all the objections found in the ordinary handle-mold divided in the center of the mold-cavity. The mold so formed is simple in construction and as cheap as the ordinary handle-molds heretofore used.

What I claim as my invention, and desire to secure by Letters Patent, is—

1. In handle-bending molds, a two-part bending-mold consisting of a fixed part and a removable part, the latter having its side portions extending beyond the center of the article to be bent at the bearing portions of the same, substantially as and for the purpose set forth.

2. In handle-bending molds, the combination of a forming-mold with a retaining-mold fitting thereon and having its side portions extending beyond the center of the article to be bent, substantially as described.

3. In handle-bending molds, the combination of a retaining-mold having one or more lugs extending beyond the center of the article to be bent, with a forming-mold having recesses in which said lugs fit, substantially as described.

4. In handle-bending molds, the combination of a retaining-mold having a retaining-lug at each end thereof, and one or more retaining-lugs between the ends and at the bearing-points of the article to be bent, with a forming-mold having recesses or depressions therein, in which said lugs fit, substantially as described.

In testimony whereof I, the said FRANK B. NEWTON, have hereunto set my hand.

FRANK B. NEWTON.

Witnesses:
JAMES I. KAY,
J. N. COOKE.